United States Patent
Schreter

(10) Patent No.: US 9,542,279 B2
(45) Date of Patent: Jan. 10, 2017

(54) SHADOW PAGING BASED LOG SEGMENT DIRECTORY

(75) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 113 days.

(21) Appl. No.: 13/290,726

(22) Filed: Nov. 7, 2011

(65) Prior Publication Data

US 2013/0117241 A1 May 9, 2013

(51) Int. Cl.
*G06F 17/30* (2006.01)
*G06F 17/40* (2006.01)
*G06F 11/14* (2006.01)

(52) U.S. Cl.
CPC ..... *G06F 11/1471* (2013.01); *G06F 17/30368* (2013.01); *G06F 17/30377* (2013.01)

(58) Field of Classification Search
USPC .......................... 707/999.101, 999.102, 745
See application file for complete search history.

(56) References Cited

U.S. PATENT DOCUMENTS

| | | | | |
|---|---|---|---|---|
| 6,192,365 B1* | 2/2001 | Draper | .................... | G06F 9/466 707/648 |
| 8,489,656 B2* | 7/2013 | Erofeev | .............. | G06F 11/1435 707/615 |
| 2005/0182797 A1* | 8/2005 | Adkins et al. | ................ | 707/200 |
| 2006/0224636 A1 | 10/2006 | Kathuria et al. | | |
| 2008/0046429 A1* | 2/2008 | Punera et al. | .................... | 707/7 |
| 2010/0082529 A1* | 4/2010 | Mace | .................. | G06F 11/1435 707/609 |
| 2010/0082547 A1* | 4/2010 | Mace | .................. | G06F 11/1435 707/648 |
| 2011/0251997 A1* | 10/2011 | Wang | ..................... | G06F 9/466 707/634 |

OTHER PUBLICATIONS

Chin-Hsien, Wu et al. "The Design of Efficient Initialization and Crash Recovery for Log-based File Systems Over Flash Memory". *ACM Transactions on Storage*. vol. 2. No. 4. (Nov. 1, 2006):449-467.

* cited by examiner

*Primary Examiner* — Sangwoo Ahn
(74) *Attorney, Agent, or Firm* — Mintz Levin Cohn Ferris Glovsky and Popeo, P.C.

(57) ABSTRACT

Replay of data transactions is initiated in a data storage application. Pages of a log segment directory characterizing metadata for a plurality of log segment are loaded into memory. Thereafter, redundant pages within the log segment directory are removed. It is then determined, based on the log segment directory, which log segments need to be accessed. These log segments are accessed to execute the log replay. Related apparatus, systems, techniques and articles are also described.

14 Claims, 4 Drawing Sheets

… (1)

SHADOW PAGING BASED LOG SEGMENT DIRECTORY

TECHNICAL FIELD

The subject matter described herein relates to techniques for providing a log segment directory utilizing shadow paging as part of a data storage application.

BACKGROUND

Databases use logging to store operations performed on corresponding data in a synchronous fashion to a log while, at the same time, writing data to a corresponding data area asynchronously. In cases of a crash or other data recovery event, the data area is recovered to a potentially older state. Replaying the log will bring the database to the last committed state. Logged data is typically stored in fixed-size or variable-sized log segments which can be represented as operation system files on a corresponding disk. Each log segment can have associated metadata such as log sequence number of the first and last entries in the segment. The metadata can also include a current state of a log segment such as open, closed, backed-up of free.

SUMMARY

In one aspect, replay of data transactions is initiated in a data storage application. Pages of a log segment directory characterizing metadata for a plurality of log segment are loaded into memory. Thereafter, redundant pages within the log segment directory are removed. It is then determined, based on the log segment directory, which log segments need to be accessed. These log segments are accessed to execute the log replay.

Metadata for each log segment can include one or more of: a log sequence number of a first entry and a last entry in the log segment, and a current state of the log segment. The log segment directory can be divided into fixed-sized or varying sized pages. Each page of the log segment directory can include one or more of: an index of a first log segment addressed by the page, a page generation value, and a checksum value, and a fixed number of log segment metadata. Removal of the redundant pages within the log segment directory can include removing pages having a same index as another page and correct checksum value but with a lower page generation value. In addition, removal of the redundant pages within the log segment directory can include removing pages having an incorrect checksum value. Physical locations on secondary storage of the removed redundant pages can be put to a free list data structure used to track free physical pages on secondary storage.

A metadata entry for a particular log segment can be modified. Such modification can include: modifying metadata of the log segment in memory, increasing a value for a current page generation counter, setting the page generation value for the log segment to the current generation counter value, assigning a new physical secondary storage location for a new page for the log segment to a physical secondary storage position taken from a free list data structure, computing a new checksum for the log segment, and adding a previous physical secondary storage location for an old page for the log segment to the free list data structure. The metadata can be modified in response to a request to execute an operation selected from a group including, for example, closing a log segment, opening a new log segment, setting a log segment backup flag, and marking a log segment as free.

In an interrelated aspect, pages of a log segment directory are loaded into memory. The log segment directory comprises metadata for a plurality of log segments such that each page of the log segment directory comprises an index of a first log segment addressed by the page, a page generation value, a checksum value and a fixed number of log segment metadata. Metadata of a first log segment in memory is then modified. A value for a current page generation counter is increased and the page generation value for the log segment is changed to the current generation counter value. A new physical secondary storage location for a new page for the log segment is assigned to a physical secondary storage position taken from a free list data structure. A checksum is computed for the log segment. In addition, the previous physical secondary storage location for an old page for the log segment can be moved to the free list data structure.

Articles of manufacture are also described that comprise computer executable instructions permanently stored on non-transitory computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, operations specified by methods can be implemented by one or more data processors either within a single computing system or distributed among two or more computing systems.

The subject matter described herein provides many advantages including faster data recovery processes. For example, with conventional techniques, log segment metadata is stored as a page at a well-defined position within the log segment (e.g., at the beginning of the log segment, etc.). Changes to the metadata such as state change requires the page to be accordingly modified. When restarting the database using these types of log segments, all log segments first have to be scanned (at least partially) for metadata information which can slow down the data recovery process.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
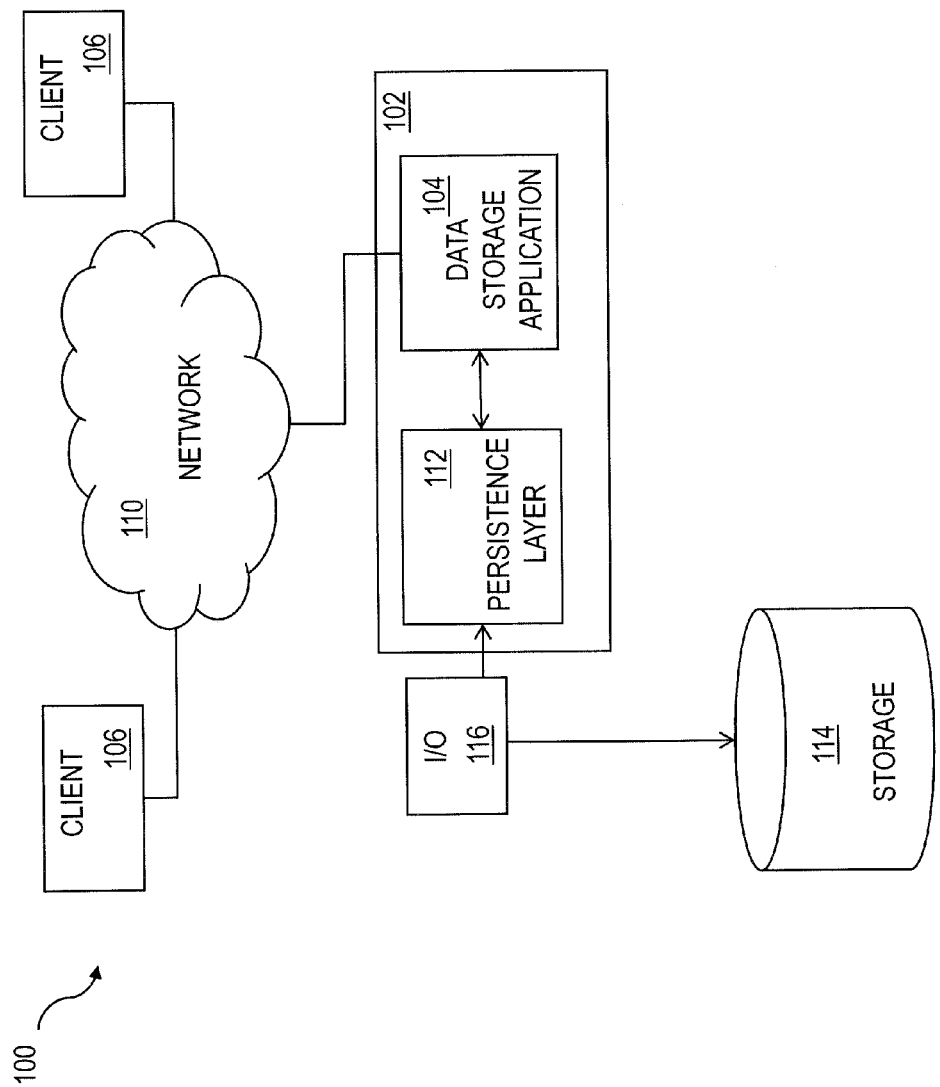
FIG. 1 is a diagram illustrating a system including a data storage application.

FIG. 1 shows an example of a system 100 in which a computing system 102, which can include one or more programmable processors that can be collocated, linked over one or more networks, etc., executes one or more modules, software components, or the like of a data storage application 104. The data storage application 104 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 102 as well as to remote users accessing the computing system 102 from one or more client machines 106 over a network connection 110. One or more user interface screens produced by the one or more first modules can be displayed to a user, either via a local display or via a display associated with one of the client machines 106. Data units of the data storage application 104 can be transiently stored in a persistence layer 112 (e.g. a page buffer or other type of temporary persistency layer), which can write the data, in the form of storage pages, to one or more storages 114, for example via an input/output component 116. The one or more storages 114 can include one or more physical storage media or devices (e.g. hard disk drives, persistent flash memory, random access memory, optical media, magnetic media, and the like) configured for writing data for longer term storage. It should be noted that the storage 114 and the input/output component 116 can be included in the computing system 102 despite their being shown as external to the computing system 102 in FIG. 1.

Data retained at the longer term storage 114 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 2:
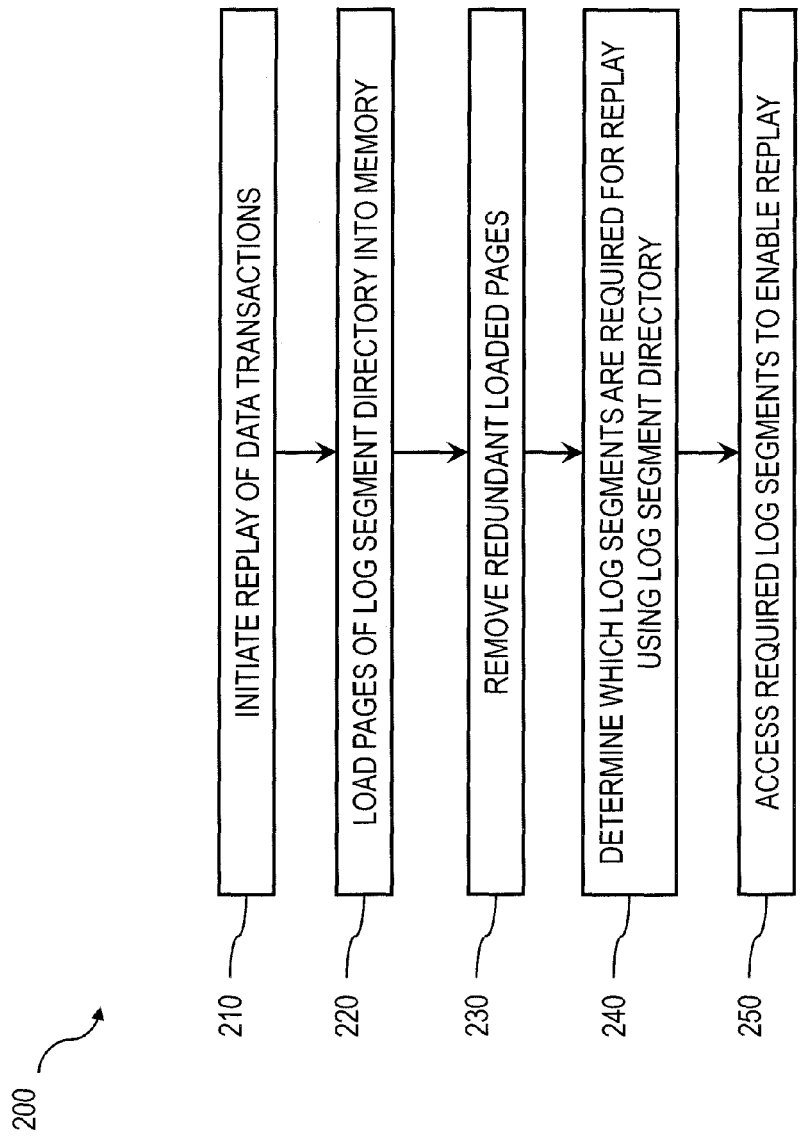
FIG. 2 is a process flow diagram illustrating data recovery using a log segment directory.

FIG. 2 is a process flow diagram 200 in which, at 210, replay of data transactions in a data storage application are initiated. Next, at 220, pages of a log segment directory are loaded into memory. The log segment directory comprises metadata characterizing a plurality of log segments. Redundant pages within the log segment directory are, at 230, removed. Thereafter, it is determined based on the log segment directory, at 340, which log segments need to be accessed so that, at 350, the log segments can be accessed to enable the replay.

Figure 3:
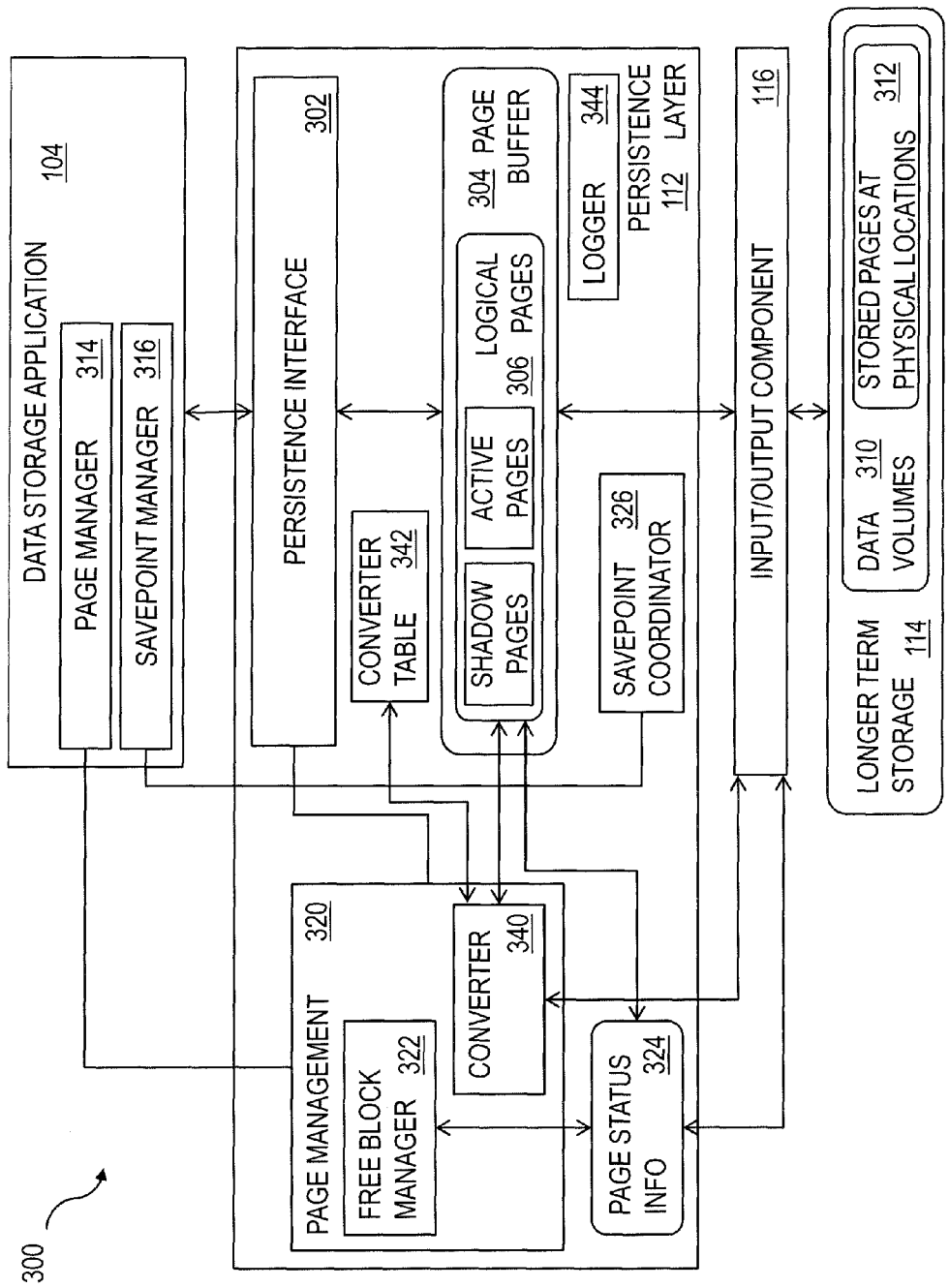
FIG. 3 is a diagram illustrating details of the system of FIG. 1.

FIG. 3 shows a software architecture 300 consistent with one or more features of the current subject matter. A data storage application 104, which can be implemented in one or more of hardware and software, can include one or more of a database application, a network-attached storage system, or the like. According to at least some implementations of the current subject matter, such a data storage application 104 can include or otherwise interface with a persistence layer 112 or other type of memory buffer, for example via a persistence interface 302. A page buffer 304 within the persistence layer 112 can store one or more logical pages 306, and optionally can include shadow pages, active pages, and the like. The logical pages 306 retained in the persistence layer 112 can be written to a storage (e.g. a longer term storage, etc.) 114 via an input/output component 116, which can be a software module, a sub-system implemented in one or more of software and hardware, or the like. The storage 114 can include one or more data volumes 310 where stored pages 312 are allocated at physical memory blocks.

In some implementations, the data storage application 104 can include or be otherwise in communication with a page manager 314 and/or a savepoint manager 316. The page manager 314 can communicate with a page management module 320 at the persistence layer 112 that can include a free block manager 322 that monitors page status information 324, for example the status of physical pages within the storage 114 and logical pages in the persistence layer 112 (and optionally in the page buffer 304). The savepoint manager 316 can communicate with a savepoint coordinator 326 at the persistence layer 204 to handle savepoints, which are used to create a consistent persistent state of the database for restart after a possible crash.

In some implementations of a data storage application 104, the page management module of the persistence layer 112 can implement a shadow paging. The free block manager 322 within the page management module 320 can maintain the status of physical pages. The page buffer 304 can included a fixed page status buffer that operates as discussed herein. A converter component 340, which can be part of or in communication with the page management module 320, can be responsible for mapping between logical and physical pages written to the storage 114. The converter 340 can maintain the current mapping of logical pages to the corresponding physical pages in a converter table 342. The converter 340 can maintain a current mapping of logical pages 306 to the corresponding physical pages in one or more converter tables 342. When a logical page 306 is read from storage 114, the storage page to be loaded can be looked up from the one or more converter tables 342 using the converter 340. When a logical page is written to storage 114 the first time after a savepoint, a new free physical page is assigned to the logical page. The free block manager 322 marks the new physical page as "used" and the new mapping is stored in the one or more converter tables 342.

The persistence layer 112 can ensure that changes made in the data storage application 104 are durable and that the data storage application 104 can be restored to a most recent committed state after a restart. Writing data to the storage 114 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 344 can also be included to store the changes made to the data of the data storage application in a linear log. The logger component 344 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 344 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 112 can use a combination of undo log entries (from one or more logs) and shadow paging.

The persistence interface 302 can handle read and write requests of stores (e.g., in-memory stores, etc.). The persistence interface 302 can also provide write methods for writing data both with logging and without logging. If the logged write operations are used, the persistence interface 302 invokes the logger 344. In addition, the logger 344 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 344. For an entry of type "update", for example, this would be the identification of the affected record and the after image of the modified data.

When the data application 104 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 344 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 344 can write a database log (or simply referred to herein as a "log") sequentially into a memory buffer in natural order (e.g., sequential order, etc.). The database log can be segmented such that it includes a plurality of log segments. In such cases, the logger 344 can additionally generate and maintain a log segment directory. The log segment directory can maintain metadata for each log segment in the log segment directory. This metadata can include, for example, a log sequence number of the first and last entry in this segment and data characterizing a current state of the log segment (e.g., open, closed, backed-up, free, etc.).

The log segment directory can be divided into fixed-size pages, which are a multiple of atomic I/O unit (i.e., sector size of underlying hardware). Each such page can contain a fixed amount of metadata information of log segments. Amount of metadata information per page can be computed as metadata_per_page=(page_size−size of (page_header))/size of (metadata).

Each page can have a header containing the following information: (i) an index of first log segment addressed by this page (first metadata in the page corresponds to this log segment), which is naturally a multiple of metadata_per_page; (ii) a page generation value (which can be based on an increasing page generation counter); and (iii) a checksum value.

To address a maximum of n log segments, one needs at least page_count=(n+metadata_per_page−1)/metadata_per_page pages. This would correspond to zero redundancy and in principle would work, when overwrite of one page of the log segment directory would be atomic in all cases. However, overwrite of one page cannot be guaranteed to be atomic, due to various reasons. Therefore, redundancy is needed. The redundancy is added by adding at least one extra/redundant page to the log segment directory (i.e., the log segment directory contains more than page_count pages, etc.).

Now, when the log segment directory is open, all pages of the log segment directory can be loaded into memory. As there are more pages than needed, one or more pages with same index value are present in the log segment directory. In this case, the page with the highest page generation value and correct checksum value will be picked and other pages with the same index (e.g., shadow pages, etc.) will be discarded and their physical position in log segment directory will be put to a free list data structure (which contains physical positions of currently free pages in log segment directory). The current page generation counter can then be set to the maximum of all page generations.

Figure 4:
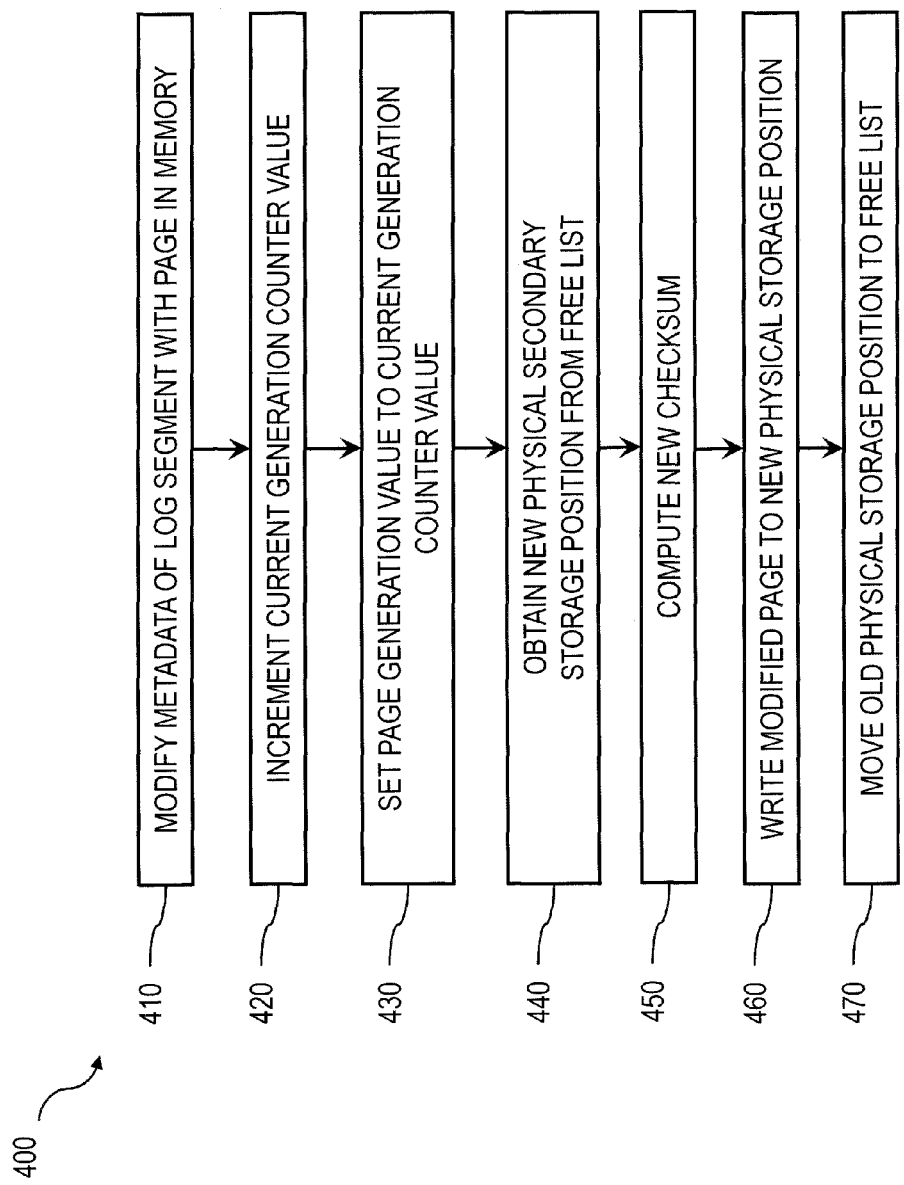
FIG. 4 is a diagram illustrating the modification of log segment metadata in the log segment directory.

When the log segment directory is requested to execute an operation, such as closing a log segment, opening a new log segment, setting log segment backup flag or marking a log segment as free, a metadata entry for the corresponding log segment needs to be modified and persisted. With reference to the process flow diagram 400 of FIG. 4, the following operations are performed. First, at 410, metadata of the log segment is modified. The current page generation counter is then incremented, at 420 and the page generation value for the log segment is set, at 430, to the current page counter value. Subsequently, at 440, a new physical secondary storage position for the modified page for the log segment is obtained from a free list data structure used for memory allocation. A new checksum is, at 450, then computed for the log segment. The modified page for the log segment is then, at 460, written to the new physical secondary storage position (as obtained previously from the free list data structure). In addition, at 470, the old physical secondary storage position for the previous version of the page for the log segment can be moved to the free list data structure.

If several shadow pages are defined, then several operations on the log segment directory can be done in parallel (provided they address different pages) and appropriate synchronous I/O operations can be executed in parallel as well, to increase throughput.

If an operation fails due to a power outage or database crash, the page written by this operation may be written only partially. During reading of log segment directory in the next run, this incomplete page will be ignored and considered as a shadow page. The old version of the page (as it was before operation on the log segment directory started executing) is still present in the log segment directory on some other physical position (i.e., the log segment directory can be recovered easily).

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A non-transitory computer program product storing instructions that, when executed by at least one programmable processor, cause the at least one programmable processor to perform operations comprising:

initiating replay of data transactions in a data storage application comprising an in-memory database;

loading pages of a log segment directory into memory of the in-memory database, the log segment directory maintaining metadata for each of a plurality of log segments in the log segment directory and each page of the log segment directory comprising an index of a first log segment addressed by the page, a page generation value, and a checksum value, and a fixed number of log segment metadata, the metadata for each log segment comprising a log sequence number of a first entry and a last entry in the corresponding log segment and data characterizing a current state of the corresponding log segment;

removing redundant pages within the log segment directory, the removing comprising:
    removing pages having a same index as another page and correct checksum value but with a lower page generation value;

determining, based on the log segment directory, which log segments need to be accessed; and accessing the log segments that need to be accessed to execute the log replay.

2. A computer program product as in claim 1, wherein the log segment directory is divided into fixed-sized pages.

3. A computer program product as in claim 1, wherein the removal of the redundant pages within the log segment directory comprises: removing pages having an incorrect checksum value.

4. A computer program product as in claim 1, wherein physical locations on secondary storage of the removed redundant pages are put to a free list data structure used to track free physical pages on secondary storage.

5. A computer program product as in claim 1, wherein the operations further comprise: modifying a metadata entry for a particular log segment.

6. A computer program product as in claim 5, wherein the modifying of the metadata entry for the log segment comprises:
    modifying metadata of the log segment in memory;
    increasing, in response to the modifying, a value for a current page generation counter;
    setting the page generation value for the log segment to the current generation counter value;
    assigning a new physical secondary storage location for a new page for the log segment to a physical secondary storage position taken from a free list data structure;
    computing a new checksum for the log segment;
    writing the modified page to the new physical secondary storage location; and
    adding a previous physical secondary storage location for an old page for the log segment to the free list data structure.

7. A computer program product as in claim 5, wherein the metadata is modified in response to a request to execute an operation selected from a group consisting of: closing a log segment, opening a new log segment, setting a log segment backup flag, and marking a log segment as free.

8. A method comprising:

initiating replay of data transactions in a data storage application comprising an in-memory database;

loading pages of a log segment directory into memory of the in-memory database, the log segment directory maintaining metadata for each of a plurality of log segments in the log segment directory and each page of the log segment directory comprising an index of a first log segment addressed by the page, a page generation value, and a checksum value, and a fixed number of log segment metadata, the metadata for each log segment comprising a log sequence number of a first entry and a last entry in the corresponding log segment and data characterizing a current state of the corresponding log segment;

removing redundant pages within the log segment directory, the removing comprising:
removing pages having a same index as another page and correct checksum value but with a lower page generation value;

determining, based on the log segment directory, which log segments need to be accessed; and accessing the log segments that need to be accessed to execute the log replay.

9. A method as in claim 8, wherein the log segment directory is divided into fixed-sized pages.

10. A method as in claim 8, wherein the removal of the redundant pages within the log segment directory comprises: removing pages having an incorrect checksum value.

11. A method as in claim 8, wherein physical locations on secondary storage of the removed redundant pages are put to a free list data structure used to track free physical pages on secondary storage.

12. A method as in claim 8, further comprising:
modifying a metadata entry for a particular log segment; wherein:
the metadata is modified in response to a request to execute an operation selected from a group consisting of: closing a log segment, opening a new log segment, setting a log segment backup flag, and marking a log segment as free;
there are a plurality of defined shadow pages;
there are a plurality of operations that are executed in parallel that each address a different shadow page.

13. A method as in claim 12, wherein the modifying of the metadata entry for the log segment comprises:
modifying metadata of the log segment in memory;
increasing, in response to the modifying, a value for a current page generation counter;
setting the page generation value for the log segment to the current generation counter value;
assigning a new physical secondary storage location for a new page for the log segment to a physical secondary storage position taken from a free list data structure;
computing a new checksum for the log segment;
writing the modified page to the new physical secondary storage location; and
adding a previous physical secondary storage location for an old page for the log segment to the free list data structure.

14. A non-transitory computer program product storing instructions that, when executed by at least one programmable processor, cause the at least one programmable processor to perform operations comprising:
initiating replay of data transactions in a data storage application comprising an in-memory database;
loading pages of a log segment directory into memory of an in-memory database forming part of a data storage application, the log segment directory maintaining metadata for a plurality of log segments in the log segment directory, wherein each page of the log segment directory comprises an index of a first log segment addressed by the page, a page generation value, a checksum value and a fixed number of log segment metadata, the metadata for each log segment comprising a log sequence number of a first entry and a last entry in the corresponding log segment and data characterizing a current state of the corresponding log segment;
removing redundant pages within the log segment directory, the removing comprising:
removing pages having a same index as another page and correct checksum value but with a lower page generation value;
modifying metadata of a first log segment in memory;
increasing, in response to the modifying, a value for a current page generation counter for the first log segment;
setting the page generation value for the log segment to the current generation counter value;
assigning a new physical secondary storage location for a new page for the log segment to a physical secondary storage position taken from a free list data structure;
computing a new checksum for the log segment;
writing the modified page to the new physical secondary storage location; and
adding a previous physical secondary storage location for a shadow page for the log segment to the free list data structure.

* * * * *